United States Patent [19]

Henry

[11] 4,247,784

[45] Jan. 27, 1981

[54] MEASUREMENT OF MATERIAL LEVEL IN VESSELS

[75] Inventor: James W. Henry, Kingsport, Tenn.

[73] Assignee: Eastman Kodak Company, Rochester, N.Y.

[21] Appl. No.: 970,401

[22] Filed: Dec. 18, 1978

[51] Int. Cl.³ .............................................. G01N 15/06
[52] U.S. Cl. ..................................... 250/577; 73/293
[58] Field of Search ........................ 250/577; 73/293; 356/381

[56] References Cited

U.S. PATENT DOCUMENTS

| 2,350,820 | 6/1944 | Rettinger | 250/222 R X |
| 4,053,234 | 10/1977 | McFarlane | 356/381 |

Primary Examiner—David C. Nelms
Assistant Examiner—Darwin R. Hostetter

Attorney, Agent, or Firm—John F. Stevens; Daniel B. Reece, III

[57] ABSTRACT

Apparatus and method are disclosed for determining the level of a light-reflecting substance with regard to a reference point. The apparatus and method comprise directing a beam of light at the substance, receiving the diffuse reflected light on an arrangement of photoelectric sensor elements in a manner such that displacement of the reflected light from a predetermined position on the sensor element arrangement is sensed electronically, generating an electrical signal which is proportional to the displacement of the reflected beam from the predetermined position on the element arrangement, and using the electrical signal to determine the amount of deviation of the level of the substance from a predetermined reference point.

12 Claims, 3 Drawing Figures

MEASUREMENT OF MATERIAL LEVEL IN VESSELS

BACKGROUND OF THE INVENTION

1. Field of the Invention

This invention relates to apparatus and method for measuring the height or level of a light-reflecting material. More specifically, this invention relates to the level measurement of various light-reflecting solids or liquids, which are normally confined in vessels.

2. Description of the Prior Art

It is often difficult to determine the level of solid or liquid material in closed vessels such as reactors, silos, various storage tanks, and the like. Often, the quantity of material in a chemical reaction tank is critical to an efficient reaction. Also, many reactions cause foaming of the reactants or reaction product and it is essential to an efficient operation that foaming be controlled, or at least monitored. Conventional methods and apparatus for determining material level such as sight glasses, scales, etc., are difficult to use in providing accurate measurements. The apparatus and method according to this invention provides a simple and convenient manner of measurement, in which continuous or intermittent measurements may be made from control stations remote from the site.

SUMMARY OF THE INVENTION

In accordance with this invention, there is provided a method and apparatus for determining the level of a light-reflecting substance in a vessel. The apparatus and method comprise directing a beam of light at the substance, receiving the diffuse reflected light on an arrangement of photoelectric sensor elements connected in a manner such that displacement of the reflected light from a predetermined position on the sensor element arrangement is sensed electronically, generating an electrical signal which is proportional to the displacement of the reflected beam from the predetermined position on the element arrangement, and using the electrical signal to determine the amount of deviation of the level of the substance from a predetermined reference point. Normally, the light source will be rigidly mounted such as to direct its beam at the top of the substance. The photoelectric sensor elements may conveniently be a commercially available apparatus arranged to detect changes in the angle of reflection of the light beam. With appropriate calibration, deviations of the level of a light reflecting surface can be determined.

DETAILED DESCRIPTION OF THE INVENTION

The invention will be described with reference to FIG. 1 as determining the level of polymer particles in a vessel. It should be understood, however, that the invention is also applicable to liquid materials, for example, in determining the level of liquid in a storage tank, or to liquid reaction materials, such as a polymerization process where foaming is encountered, in which case the foam becomes the light reflecting substance. Other applications will be obvious to those skilled in the art.

Figure 1:
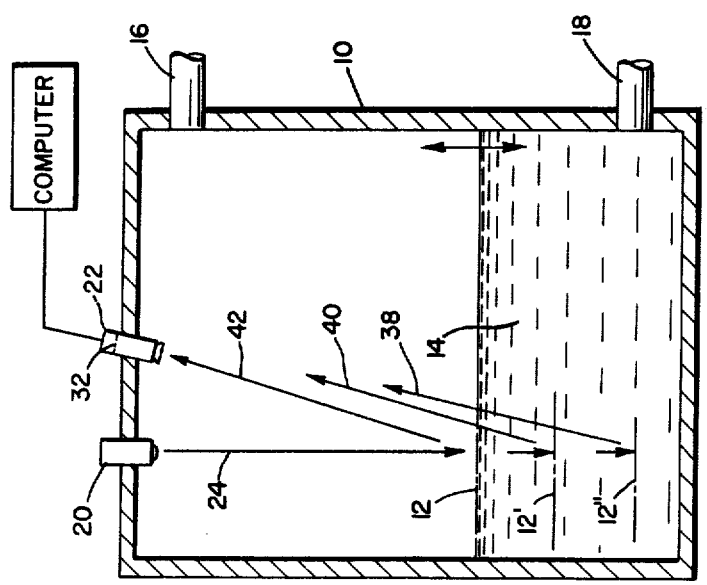
FIG. 1 is a diagrammatic elevation view in section of the level measuring apparatus and method according to my invention.

Referring to FIG. 1, storage silo 10 contains a level 12 of polymer particles 14 which normally will vary during a period of time. Silo 10 is of a construction whereby sight measurements, weight measurements, etc., are very inconvenient, if not impossible, to obtain. Also, there is normally both an entrance 16 and exit 18 through which the particles 14 flow, and the level may vary considerably.

According to this invention, a light source 20 and a photoelectronic linear displacement measuring device 22 are mounted in the top of the vessel above the level of material. Light rays 24 from the light source 20 strike the top of the material and are reflected into the lens of light angle measuring device 22. The angle is measured, and the measurement is fed into a computer which is programmed to determine the deviation of the level of material from a predetermined position by the angle of the reflected beam.

A preferred light source 20 includes a point source electrical discharge lamp or laser with optical divergiang lens such as to provide a diverging beam. Examples of suitable light sources include a zirconium arc, a concentrated filament incandescent lamp, a point source xenon arc, etc. Such a light source is preferably used with a suitable optical diverging system so that the extent of divergence of the beam matches or is adjusted to correspond to the degree of convergence inherent in the camera lens system. In this manner a constant size light spot is received by the arrangement of photodiodes regardless of the distances between light source and substance 14, and between substance 14 and device 22.

A preferred light angle measuring device would be a charge coupled array of photodiodes or phototransistors arranged in a linear array such that the array can be used to measure length by counting the number of photo elements illuminated or darkened. Such an array is included as a part of a linear measuring camera produced by Reticon Corporation of Sunnyvale, California, U.S.A. Both the laser beam source and camera are commercially available and their operations are well known to those skilled in the art. Briefly, however, the beam source emits a small light beam which is subsequently reflected to the camera. The camera focuses the reflected beam by means of lens 30, onto a plate 32 having a plurality of photoelectric sensor bars 34, which are activated to generate an electrical signal proportional to the distance between the first bar illuminated, or the last bar left dark, and the beginning of the photoelectric sensor array. The camera and light projection source are aligned so that the furthermost level to be determined as to distance by the system produces an imaged spot of light which falls upon the first photoelectric sensor in the array. The distance between this first sensor and other sensors in the array is then determined by counting the number of pulses which must be applied to the array in order to effect stepping of photosensitivity in the sensor bars to the point at which distance from the initial bar to the final bar transitioning from light to dark is situated in the array. If the target is positioned at a distance from the camera such that it can effectively be considered indeterminate (i.e., infinity distance), the reflected image will not fall upon the initial photoelement in the array and no count signal will be produced. If the angle is very small, a relatively small number of bars are activated, indicated at 38, and the signal generated is proportionally small. If, however, the angle increases, as by line 40 or line 42, more bars are activated as indicated by distances 44 and 46 and proportionally larger signals are produced. Calculating devices can be calibrated to read the distance from light source 20 to the material level 12.

The camera consists of a charge coupled array of photodiode sensors having a rectangular shape for each sensor element. According to design there may be as many as over one thousand such elements in an array, each element having a width of about 0.0005 inches and a length of from 0.010 to 0.020 inches. These elements are arrayed in parallel so that the smaller dimension runs horizontally across the total array. In the instrument preferred for use for construction of the distance measuring device, an array containing about 500 such elements is used. Contained within the camera system is a crystal controlled electronic oscillator which supplies an alternating current or pulse train to a binary countdown train. The rapidly repeating pulses are thus reduced in repetition time and lengthened in pulse duration by the countdown system. Depending upon the need for speed, a tap is taken in the countdown train which supplies pulses with the desired repetition rate. These pulses are applied to the photodiode array and cause the stepping of photosensitivity across the array in step with the pulses applied. Only one photosensitive element is sensitized at one time. The reception of light by a sensitized diode is detected as an electrical current flow through the diode. This is translated into an electrical voltage which is used to actuate a simple electronic gate to stop the accumulation of counts in an electronic counter system. An initializing pulse is generated at the beginning of a scanning operation. This pulse activates the counter which accumulates the pulses which step the photodiode array across the array to sensitize the photodiodes. The pulse generated by the illumination of the photodiode causes the counter to stop the accumulation of counts. The number of counts accumulated is related to the distance of the illuminated photodiode from the beginning of the photodiode array.

Light source 20 and light angle measuring device 22 may be mounted in the top of the vessel 10 as indicated. The distance between them is not critical, and will vary according to convenience for different apparatus, as well as the specifications for the equipment. Normally, light source 20 will be aimed directly at the level 12, or theoretically will be perpendicular to the level 12. Normally, light angle measuring device 22 will be angled slightly at the light beam 24. Angles of from about 0.05+ up to about 5+ would be preferred.

A typical installation would have the following specifications:
  height of tank—25 feet
  level of material—20 feet to 22 feet from bottom
  material—polymer pellets
  distance between light source and light masuring device—8 inches
  type of light—laser (Spectrophysics 3 milliwatt helium neon)
  light angle measuring device—Reticon camera, Model LC-600V512-1/6
  computer type —Intel 8020

Figure 2:
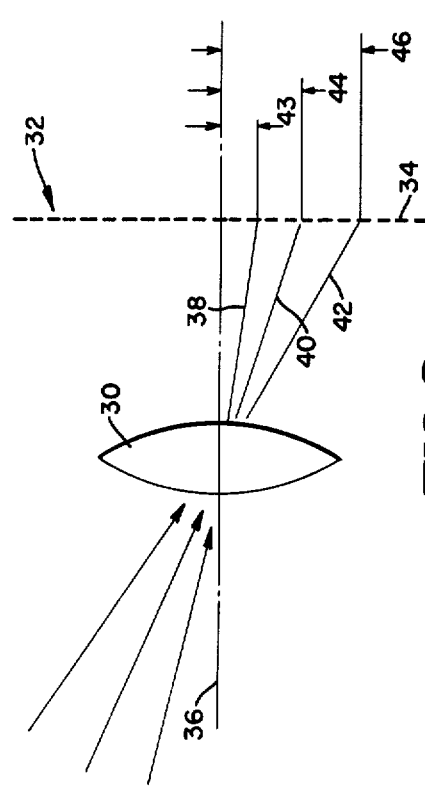
FIG. 2 is a diagrammatic view illustrating the reception of a reflected beam onto an arrangement of photoelectric sensor elements.
Figure 3:
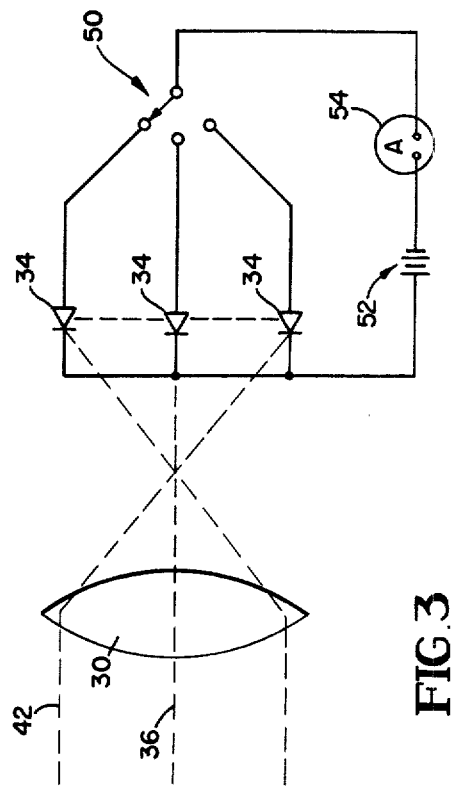
FIG. 3 is a view similar to FIG. 2, illustrating a greatly reduced number of photoelectric sensor elements, and the principal of operation in which angles of the reflected beam of light are determined.

Referring to FIG. 3, a schemmatic illustration of the principal of operation of the arrangement of photoelectric sensor elements is presented. For the sake of simplicity, only three photodiodes are shown, which may be considered to be the center and end photoelectric sensing elements. If the reflected beam were transmitted through lens 30 along line 36, the center photodiode 34 would conduct current, and the ammeter 54 would only produce a reading when switch 50 was in the center position, indicating a central position of the substance of which the level is being measured. Likewise, if the level was at an extreme low or high position, the reflected light would be transmitted through lens 30 at one of the extreme outer positions, to activate one of the outer photodiodes 34, so that ammeter 54 would only produce a reading when switch 50 completed the circuit through the activated photodiode, indicating an extremely high or extremely low position of the substance of which the level is being measured. Commercially available units, such as described herein, containing a multiplicity of such photodiodes and corresponding circuits, are effectively used and linked to a computer, whereby various levels of substance may be determined.

The following examples are submitted for a better understanding of the invention.

EXAMPLE 1

A measuring system is installed in a partially evacuated vessel in which a reaction is carried out for the purpose of building up the molecular weight of a molten polyester. Two ports covered with optical glass flats of borosilicate glass having diameters of 5 inches and thickness of $\frac{1}{4}$ inch are installed in the walls of the vessel near to top of the dome of the vessel. Circular hoods are arranged on the interior of the vessel around each of the ports, and dry nitrogen gas under low pressure (about 0.5 inch of water) is allowed to flow into nozzles installed within the hoods. The resulting gas flow produces a slight positive pressure within the hoods which prevent polymer vapors from entering the hoods and accumulating on the glass ports. The ports are displaced on centers by 12 inches and a light source consisting of an 8.25 inch focal length lens collimating the radiation from a 100 watt 0.7 mm diameter zirconium arc point source is directed through the glass of the port nearest the center of the vessel. The camera equipped with a 6 inch f:2.8 lens is aimed through the second port and is adjusted so that the spot of light falling on the bottom of the tank is imaged on the initial photodiode of the photosensitive array within the camera. The camera is equipped with a control box including a counter system arranged to trigger the system to accumulate a count of all the dark elements between the initial element and the first light element. A conversion chart is used to translate the counted diodes into tank depth (or distance of the reflecting surface from the camera). The vessel is filled to the appropriate depth (about 20 feet) with melted polymer and the reaction begins. A froth or foam develops over the surface of the molten polymer. This white reflecting foam reflects the beam of light into the camera lens. The distance of the foam from the camera lens can be determined to within less than one inch. By using this determination, it is possible to regulate the heat and pressure in the reactor to maintain the foam at a level insufficient to overflow the vessel, while at the same time maintaining the rate of operation at an economic rate.

EXAMPLE 2

A silo filled with white polymer pellets is equipped with the measuring system. Because of the need to exclude moisture vapor from the silo, it is necessary to seal the vessel and look into it through glass ports as in Example 1. Again it is necessary to exclude dust from the hooded ports by a flow of dry gas. The vessel is filled to a depth of 30 feet and material gradually withdrawn until a depth of about 5 feet is reached. During the withdrawal period, the surface of the pellets is accurately tracked, and it is found to relate to the depth of the pellets withdrawn and the volume of the vessel evacuated.

The invention has been described in detail with particular reference to preferred embodiments thereof, but it wil be understood that variations and modifications can be effected within the spirit and scope of the invention.

I claim:

1. Method of determining the level of a substance in relation to a reference point comprising the steps of
   (a) directing a substantially stationary beam of light at said substance,
   (b) receiving the diffuse reflected light on an arrangement of photoelectric sensor elements connected in a manner such that displacement of the reflected light from a predetermined position on said element arrangement is sensed electronically by counting the number of sensor elements between the original and displacement positions,
   (c) generating an electrical signal which is proportional to the number of sensor elements counted, and
   (d) using said electrical signal to determine the amount of deviation of the level of said substance from a predetermined reference point.

2. Method according to claim 1 wherein said substance is a liquid contained in a vessel.

3. Method according to claim 1 wherein said substance is a solid contained in a vessel.

4. Method according to claim 1 wherein said photoelectric sensor elements are photodiodes.

5. Method according to claim 1 wherein said substance is a foaming liquid.

6. Method according to claim 1 wherein said level is substantially constantly changing.

7. Method according to claim 1 wherein said beam of light originates from a point source and is directed through an optical diverging lens system prior to striking said substance.

8. Method of determining the level of a substance in a vessel comprising the steps of
   (a) directing a substantially stationary divergent beam of light at the surface of said substance,
   (b) receiving the reflected beam on an arrangement of photoelectric sensor elements connected in a manner such that displacement of the reflected light from a predetermined position on said element arrangement is measured by counting the number of sensor elements between the original and displacement positions,
   (c) generating an electrical signal which is proportional to the number of sensor elements counted,
   (d) calibrating the magnitude of said electrical signal to differences in the level of substance in said vessel, and
   (e) using said electrical signal to determine the amount of deviation of the level of said substance from a predetermined reference point.

9. Apparatus for determining the level of substance in a vessel comprising
   (a) means for directing a substantially stationary beam of light at said substance,
   (b) an arrangement of photoelectric sensor elements positioned to receive the reflected beam of light, said sensor elements being connected in a manner such that displacement of the reflected light from a predetermined position on said element arrangement is sensed electronically by counting the number of sensor elements between the original and displacement positions, and
   (c) for generating an electrical signal proportional to the, number of sensor elements counted, whereby the amount of deviation of the level of said substance from a predetermined reference point is determined.

10. Apparatus for determining the level of substance in a vessel comprising
    (a) a light source positioned to direct a beam of light at the surface of said substance,
    (b) a reflected light receiving device mounted in a predetermined position with reference to said light source, said device comprising an arrangement of photoelectric sensor elements connected in a manner such that displacement of the reflected light from a predetermined position on said element arrangement is sensed electronically by counting the number of sensor elements between the original and displacement positions, and
    (c) means for generating an electrical signal proportional to the number of sensor elements counted, whereby the amount of deviation of the level of said substance from a predetermined reference point is determined.

11. Method of determining the level of a substance in a vessel comprising the steps of
    (a) directing a substantially stationary divergent beam of light at the surface of said substance,
    (b) converging diffuse reflected light and directing it onto an arrangement of photoelectric sensor elements connected in a manner such that displacement of the reflected light from a predetermined position on said element arrangement is measured by counting the number of sensor elements between the original and displacement positions,
    (c) generating an electrical signal which is proportional to the number of sensor elements counted,
    (d) calibrating the magnitude of said electrical signal to differences in the level of substance in said vessel, and
    (e) using said electrical signal to determine the amount of deviation of the level of said substance from a predetermined reference point.

12. Method according to claim 11 wherein the angle of convergence of the reflected light is matched to the angle of divergence of the beam such that the spot of light received on the arrangement of photoelectric sensor elements is approximately the same size regardless of the level of substance.

* * * * *